(12) United States Patent
Kim et al.

(10) Patent No.: US 9,390,567 B2
(45) Date of Patent: Jul. 12, 2016

(54) SELF-MONITORING AND ALERT SYSTEM FOR INTELLIGENT VEHICLE

(71) Applicant: Harman International Industries, Incorporated, Stamford, CT (US)

(72) Inventors: Seonman Kim, Palo Alto, CA (US); Rajesh Khandelwal, Princeton Junction, NJ (US); Donald Butts, Milford, CT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 109 days.

(21) Appl. No.: 14/173,670

(22) Filed: Feb. 5, 2014

(65) Prior Publication Data

US 2015/0221142 A1    Aug. 6, 2015

(51) Int. Cl.
| | |
|---|---|
| *G07C 5/00* | (2006.01) |
| *G07C 5/08* | (2006.01) |
| *H04N 7/18* | (2006.01) |
| *G06F 9/54* | (2006.01) |

(52) U.S. Cl.
CPC ............. *G07C 5/008* (2013.01); *G06F 9/542* (2013.01); *G07C 5/0841* (2013.01); *G07C 5/0866* (2013.01); *H04N 7/188* (2013.01)

(58) Field of Classification Search
CPC .... G07C 5/008; G07C 5/0866; G07C 5/0841; H04N 7/188; G06F 9/542
USPC ................................................ 701/32.3–32.9
See application file for complete search history.

(56) References Cited

U.S. PATENT DOCUMENTS

| | | | |
|---|---|---|---|
| 8,000,842 B2 * | 8/2011 | Yi et al. ........................ 701/1 |
| 8,432,268 B2 * | 4/2013 | Flick ...................... 340/426.1 |
| 8,731,773 B2 * | 5/2014 | Yousefi et al. .............. 701/36 |
| 2004/0128159 A1 * | 7/2004 | McGinn et al. .............. 705/1 |
| 2004/0142678 A1 | 7/2004 | Krasner |
| 2006/0092278 A1 | 5/2006 | Kondo et al. |
| 2009/0256690 A1 | 10/2009 | Golenski |
| 2009/0309713 A1 | 12/2009 | Baruco et al. |
| 2013/0110302 A1 * | 5/2013 | Ferlitsch et al. .......... 700/295 |

FOREIGN PATENT DOCUMENTS

WO    2014184543 A1    11/2014

OTHER PUBLICATIONS

European Search Report dated Jun. 15, 2015 in Application No. 15152075.

* cited by examiner

*Primary Examiner* — Richard Camby
(74) *Attorney, Agent, or Firm* — Artegis Law Group, LLP

(57) ABSTRACT

System, method, and computer program product to perform an operation, by, responsive to receiving a vehicle event notification by a computing system in a vehicle, switching the computing system from a sleep mode to an active mode, sending, to a user, a user notification generated responsive to the vehicle event notification, and returning the computing system to the sleep mode.

19 Claims, 6 Drawing Sheets

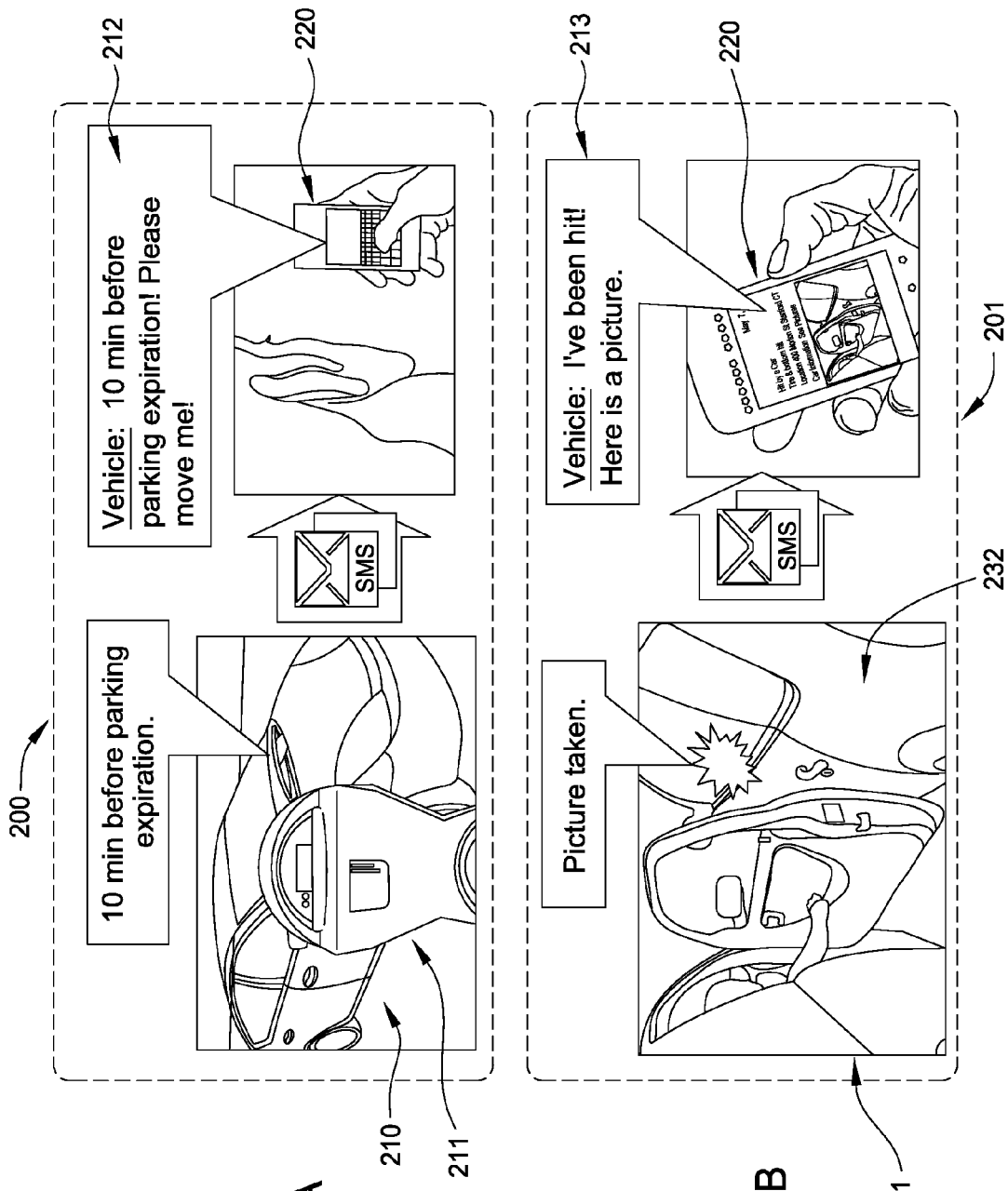

SELF-MONITORING AND ALERT SYSTEM FOR INTELLIGENT VEHICLE

BACKGROUND

Currently, when vehicles are turned off, they are not configured to provide information to its owner. As such, the vehicle cannot convey information related to ambient situations to its owner (or other users). Additionally, the vehicle remains unable to take actions in response to critical situations or user requests.

SUMMARY

Embodiments disclosed herein include a system, method, and computer program product to perform an operation, by, responsive to receiving a vehicle event notification by a computing system in a vehicle, switching the computing system from a sleep mode to an active mode, sending, to a user by a wireless data connection, a user notification generated responsive to the vehicle event notification, and returning the computing system to the sleep mode.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 2A-2D are schematics illustrating techniques for self-monitoring and alert systems for an intelligent vehicle, according to one embodiment.

DETAILED DESCRIPTION

Figure 1:
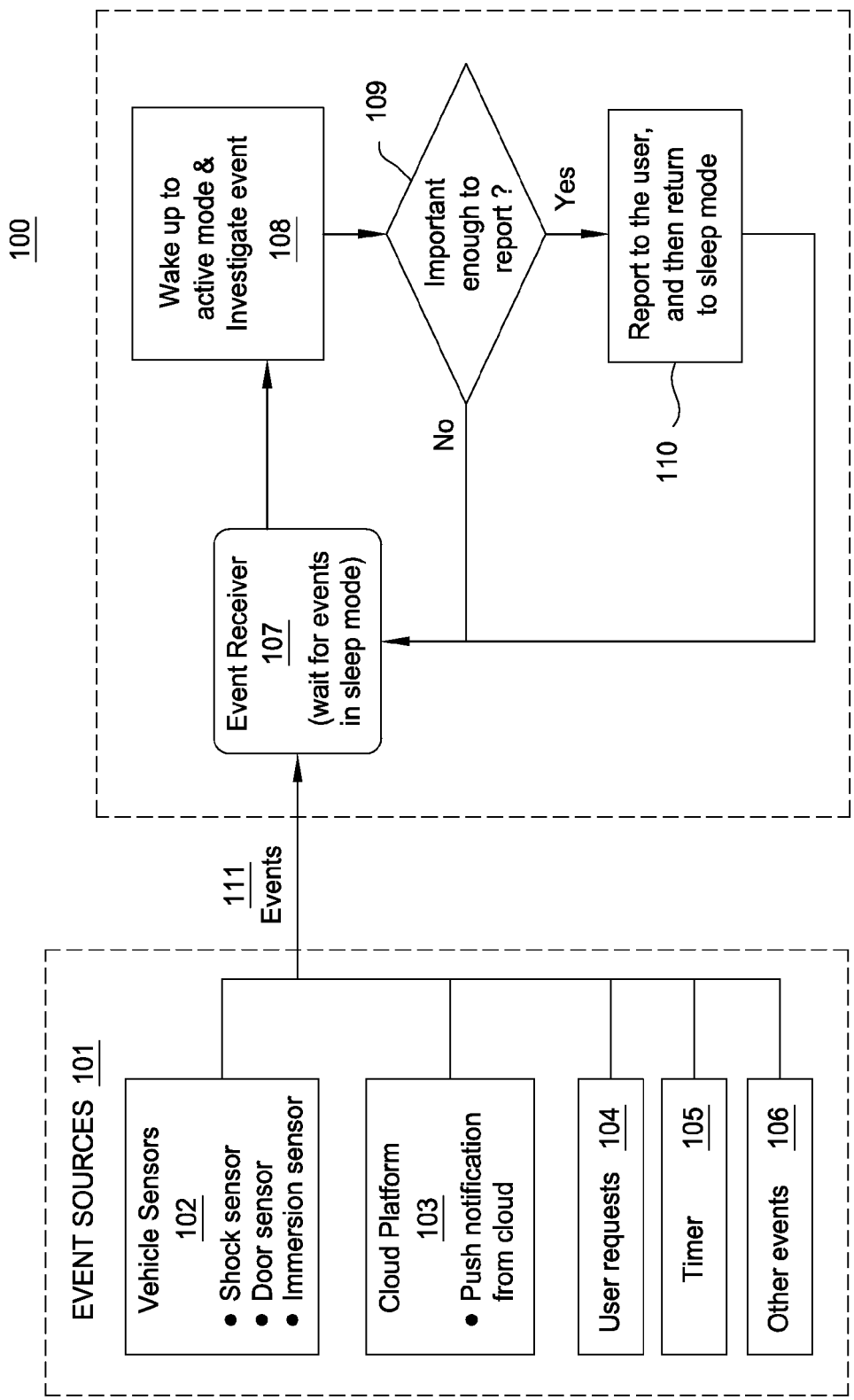
FIG. 1 is a block diagram illustrating a logical view of a system for self-monitoring and alert systems for an intelligent vehicle, according to one embodiment.

Embodiments disclosed herein provide an autonomous system which allows vehicles to sense events relating to the vehicles themselves and their surroundings, communicate with users, and take actions whenever necessary. In particular, the autonomous system performs such event sensing even while the vehicle is parked with the engine turned off. In one embodiment, the autonomous system provides two modes (or states), including a sleep mode and an active mode. While in the sleep mode, the vehicle is in a low-power state, and awaits input events from any number of event sources. Example event sources include, without limitation, vehicle sensors, vehicle cameras, user requests, application requests, and cloud-based event sources. When the vehicle receives an event source, such as a signal from a shock sensor indicating the vehicle has been hit or a signal indicating a collision with an object is imminent, the autonomous system enters the active mode. While processing the event, the autonomous system may collect any relevant information and send a notification to the owner. In one embodiment, the autonomous system may first determine whether the event is important enough to notify the owner. The notification may contain an explanation of the event, as well as audio, pictures, and video captured by the autonomous system. The autonomous system may then return to sleep mode once the autonomous system processes the event.

For example, if a shopping cart strikes a parked vehicle in a parking lot, the shock sensor in the vehicle may send an event signal to the autonomous system, which may be in sleep mode. Upon receiving the event signal, the autonomous system may enter the active mode in order to process the event signal. If event signal generated by the shock sensor indicates that the force of impact exceeds a predefined threshold, the autonomous system may capture images of the exterior of the vehicle, including the area where the impact occurred. The autonomous system may then send a notification of the event to the owner (or other users). For example, the notification may include the images, a description of the force of the impact, and may be sent by any communications method, including SMS, email, and social media messaging. If the event signal indicated a much stronger force, such as that typically received during a collision with another vehicle, the autonomous system may also send the notification, along with GPS coordinates, to other entities such as the police and insurance carriers. Once the autonomous system processes the event, it returns to the sleep mode.

In addition, the autonomous system may also allow users to access or communicate with the car remotely via the Internet. For example, if the user wishes to check whether the sunroof is open, or they left their wallet on the front seat, the user may issue a request to the vehicle for information. Once the request is received, the autonomous system may enter active mode and process the request. For example, the autonomous system may check the status of the sunroof, and close the sunroof if it is open. The autonomous system may also capture images of the vehicle interior and send the images to the user in order to allow the user to determine whether the wallet is in the car.

The autonomous system may also take "before and after" photos of the vehicle interior. For example, the system may take a "before" photo of the vehicle interior as the driver enters the vehicle and starts the car. When the driver leaves the car, the system may take an "after" photo of the vehicle interior. The system may then process and compare the two images in order to detect changes, and notify the user that objects may have unintentionally been left behind. For example, if the "after" photo includes an object, such as a wallet or purse, that was not in the "before" photo, the system may send a notification (which may include the before and/or after photos) to the user that they left their wallet or purse in the vehicle.

As used herein, a "vehicle event notification" may include any input received from any number of sources that are directed at a vehicle. For example, a "vehicle event notification" may include event notifications from sensors or other instruments in the vehicle, as well as an event notification sent via the Internet, such as a "wake up" command. The "vehicle event notification" contemplates any command and other instructions issued by a user or application sent via the Internet. A "user notification," as defined herein, includes any response of any format that is generated responsive to a vehicle event notification. For example, a "user notification" may include, but is not limited to, a photo or live video stream of the interior or exterior of a vehicle, an email, SMS, or picture message, or a telephone call. Generally, the user notification can provide any type of information in any number of formats.

FIG. 1 is a block diagram illustrating a logical view of a system 100 for self-monitoring and alert systems for an intelligent vehicle, according to one embodiment. The system 100, implemented in a vehicle, is generally configured to operate in two modes, a sleep mode and an active mode, in order to receive events from one or more event sources, and communicate relevant events to users. As shown, the system includes a number of event sources 101, which include vehicle sensors 102, cloud platform 103, user requests 104, a timer 105, and other events 106. The vehicle sensors 102 may include any type of sensor or other input source from a vehicle, such as a shock sensor, door sensors, and immersion sensors, as well as thermometers and other instruments. The cloud platform 103 may provide events through push notifications from one or more cloud-based servers, such as a notification that parking rules in a space that a vehicle is currently parked in will go into effect at a specified time in the morning hours, after free overnight parking expires.

The cloud platform 103 may leverage any information, including GPS data from the vehicle, as well as other information from the Internet and the cloud platform 103, in order to generate event notifications (and later analyze events sent by the vehicle to the cloud platform 103). User requests 104 may include any type of request issued by a user. The user requests 104 may be generated through by remote application executing on a smartphone, computer, tablet, or other computing device, and sent to vehicle via the Internet or other network connection. For example, a user request 104 may include a request to take a picture of the external surroundings of the vehicle or the interior of the vehicle using one or more cameras configured to capture photos or video of the interior and/or exterior of the vehicle. The timer 105 may be a timer internal to the vehicle, which may be set to send event notifications upon when the time elapses. For example, if a user provides 30 minutes worth of credit in a parking meter, the timer may be set to 25 minutes, triggering an event notification when the 25 minute timer elapses. The other events 106 include any type of event, presently known or unknown, that may be relevant to a user or the vehicle.

Collectively, the event sources 101 generate event notifications 111 that are received by an event receiver 107. The event notifications 111 may indicate a type of event, a source of the event, and any other relevant information regarding the event. The event receiver 107 is incorporated in logic in the vehicle, and waits for event notifications 111 while in sleep mode. As indicated in block 108, when the event receiver 107 receives an event notification 111 from an event source 101, the system wakes up to active mode and investigates the event. For example, the event notification 111 may indicate that the vehicle was struck from the rear at a specified force. To investigate the event, the system 100 may take photos of the outside of the vehicle in order to detect the cause of the impact, as well as reference the cloud platform 103 for other sources of information. At block 109, the system 100 may determine whether the event is important enough to report to a driver. In at least some embodiments, a predefined threshold may be defined that must be exceeded before sending a notification. For example, an impact threshold may specify an amount of force that must be exceeded in order to send a notification to the user, such that trivial impacts, such as those caused by a person sitting on a bumper, do not trigger notifications. If the threshold is exceeded, the system 100 reports the event to the driver by any number of communications methods, including telephone calls, SMS messages, MMS messages, emails, and the like.

FIG. 2A is a schematic 200 illustrating techniques for self-monitoring and alert systems for an intelligent vehicle, according to one embodiment. As shown, a vehicle 210 is parked in front of a parking meter 211. The vehicle 210, equipped with the autonomous system disclosed herein, may send an SMS notification 212 to the user's phone 220 when the time before the parking credits in the meter 211 expire. For example, when the user parks the vehicle 210, the autonomous system may use the GPS location in order to determine which street the vehicle 210 is on. The autonomous system may then identify a parking rule associated with the street from the cloud, which may include a maximum parking time. The autonomous system may then set a timer to expire 10 minutes prior to the maximum parking time. Any method may be used to set the timer, including a user-defined timer, or communications between the vehicle 210 and the parking meter 211 allowing the vehicle 210 to determine how much money the user put in the parking meter 211. When the timer expires, the timer sends an event notification to the event receiver, which sends the notification 212 to the user. In one embodiment, the autonomous system may send the notification 212 to the cloud, which then forwards (and possibly alters or enhances) the notification 212 to the user's phone 220.

FIG. 2B is a schematic 201 illustrating techniques for self-monitoring and alert systems for an intelligent vehicle, according to one embodiment. As shown, a door of vehicle 231 has struck vehicle 232. A shock sensor in vehicle 232 may register the impact, and send an event notification to the event receiver, which wakes the autonomous system to the active mode. Once in the active state, the autonomous system processes the event notification by taking at least one picture (or a surround view) of the vehicle 232, and generating an SMS notification 213 that the user receives on the phone 220. Once the autonomous system processes the event notification, the autonomous system is returned to sleep mode, where it continues to wait for further event notifications.

Figure 2C:
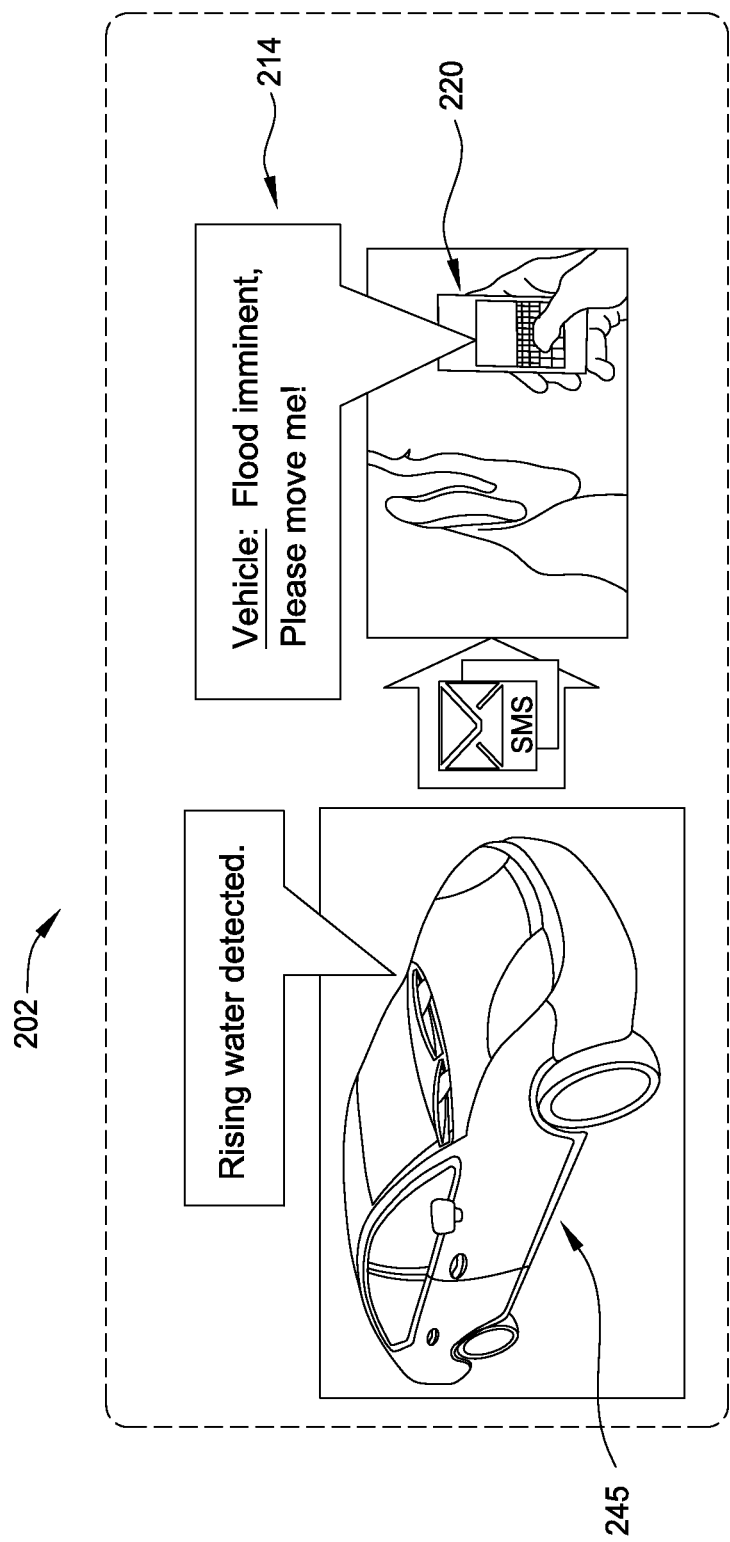

FIG. 2C is a schematic 202 illustrating techniques for self-monitoring and alert systems for an intelligent vehicle, according to one embodiment. As shown, the vehicle 240 is surrounded by water. An immersion sensor in the vehicle 240 may detect rising water, and trigger an event notification, which is sent to the event receiver. The event receiver wakes the autonomous system into the active mode, and the autonomous mode may process the event notification. In processing the event, the autonomous system may connect to the Internet or other data sources in order to determine whether heavy rains or other flooding conditions have been observed in the area around the vehicle 240. In doing so, the autonomous system may potentially eliminate false warnings. If the autonomous system determines that a flood is imminent, it may generate the SMS warning 214, which is then sent to the user's smartphone 220 so that the user may move his vehicle. In another embodiment, the Internet/cloud data sources may determine that the vehicle is at risk of flood damage, and send a notification to the user. Additionally, the Internet/cloud data sources may send a command to the car to take an action, such as rolling up all windows and/or closing a sunroof, in order to avoid damage from the flood.

Figure 2D:
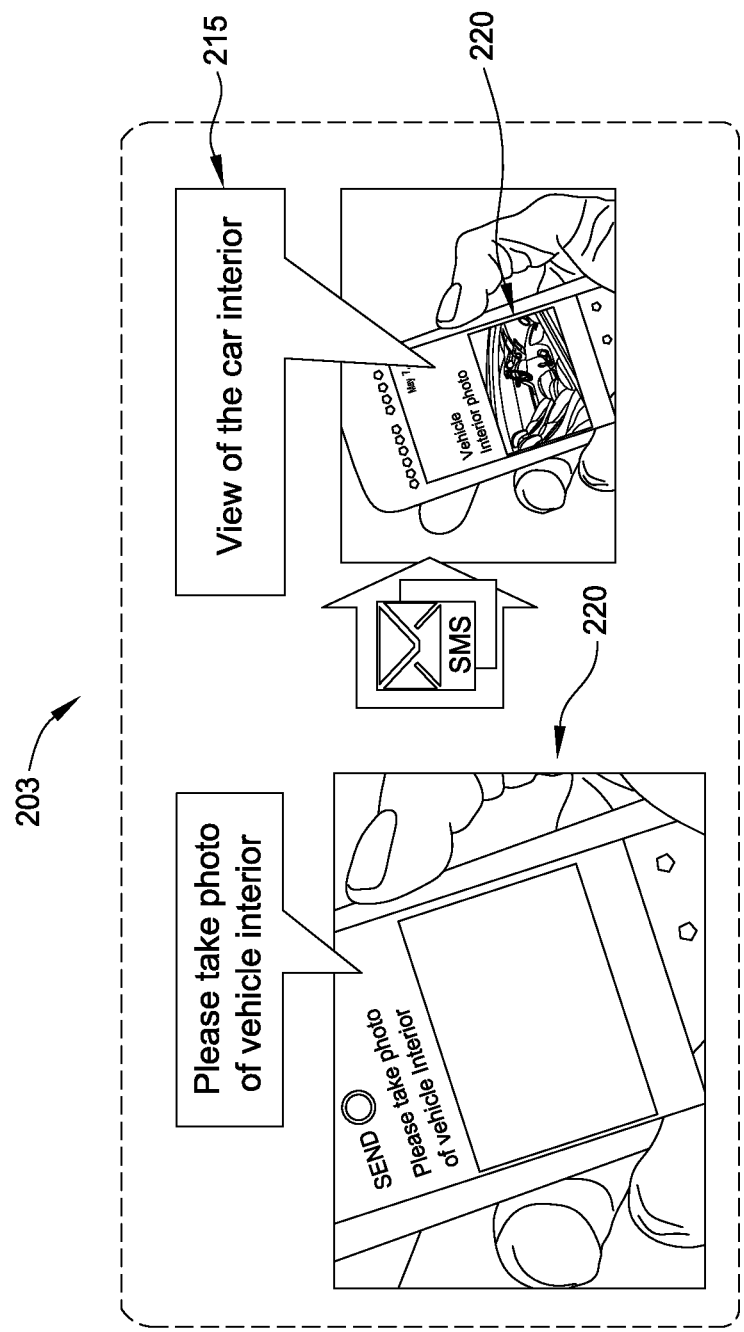

FIG. 2D is a schematic 203 illustrating techniques for self-monitoring and alert systems for an intelligent vehicle, according to one embodiment. As shown, the user has generated a request to view the interior of a vehicle on the smartphone 220. Once the request is sent, the event receiver in the vehicle wakes the vehicle to the active mode. Once the vehicle is in active mode, it may process the request in order to determine that the user wishes to view the interior of the vehicle. In response, the autonomous system may take one or more photos of the interior of the vehicle, and generate a notification 215 which includes the photos of the interior of the vehicle. The notification 215 may be sent to the user, where it is displayed on the smartphone 220. Alternatively or additionally, a live video stream of the interior of the vehicle may be sent to the user.

Figure 3:
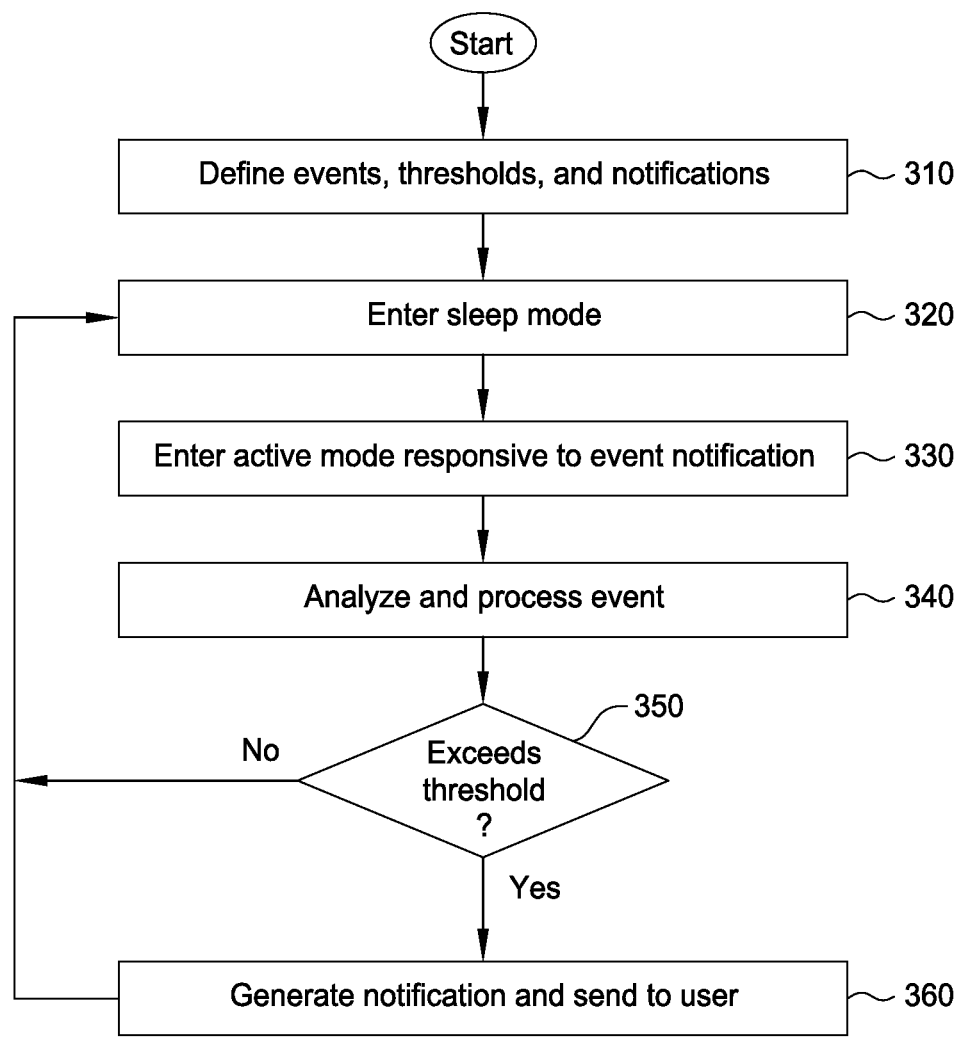
FIG. 3 is a flow chart illustrating a method to implement self-monitoring and alert systems for an intelligent vehicle, according to one embodiment.

FIG. 3 is a flow chart illustrating a method 300 to implement self-monitoring and alert systems for an intelligent vehicle, according to one embodiment. Generally, a vehicle including a system executing the steps of the method 300 may be aware of itself and its surroundings through the use of one or more sensors, or other input sources, while in a low-power sleep mode. When the system receives an event notification, it enters an active state, processes the event, and may send one or more users a notification.

At step 310, a user (or the system) defines one or more events, thresholds, and notifications. For example, a thermometer inside the cabin of a vehicle may be used to monitor the interior temperature of the vehicle. A user may specify that if the temperature exceeds 100 degrees Fahrenheit, an event notification may be triggered. The user may also specify one or more temperature thresholds and an associated notification for each. For example, if the temperature is between 100 and 110 degrees, the system should send an SMS notification. However, if the temperature exceeds 110 degrees, the user may specify that the system send an SMS and call the user's cell phone. Generally, the method 300 may support any type and combination of input source, event, and notification.

At step 320, the system enters the sleep mode and waits for event notifications from the event sources. At step 330, the system enters the active mode responsive to receiving an event notification. For example, a user or application in the cloud may wake the car to ask what the internal cabin temperature is. As another example, a door sensor of the car may report that someone unsuccessfully attempted to open a locked car door. At step 340, the system may analyze and process the event. This step may include the system accessing information on the Internet, or in the cloud, to learn more about the reasons for the event. The system itself may also reference internal logic and the data included in the event notification to determine the reasons for event. Additionally, the system may also gather additional information to process the event, such as taking photos, videos, or sound clips, or retrieving sensor or other data readings in order to report these findings to the user.

At step 350, the system determines whether one or more parameters, or a score computed for the event exceeds a specified relevance threshold. For example, a user-defined (or cloud-defined) threshold may specify that more than 3 unsuccessful attempts to open a locked door must be detected in order to trigger a notification to the user. As another example, an event score threshold may be defined, such that the system computes an event score for each event in order to determine whether the event score exceeds the event score threshold. For example, the event score for attempting to open locked doors may be based on the number of times the user unsuccessfully attempted to open the car door, a time of day, and a location of the vehicle. If multiple attempts are detected late at night in an area determined to be of high-crime (based on GPS data), the score computed may exceed the threshold. If the event does not exceed the relevance threshold, the system returns to sleep mode at step 320. If the event exceeds the relevance threshold, at step 360, the system may generate the notification, and send the notification to the user. In some embodiments, one or more software modules in the cloud may generate and/or send the notification to the user. Generally, any format may be used for the notification, including email, text message, SMS, MMS, telephone calls, social media services, and the like. Any type of content may be included in the notification. Once the notification is sent to the user, the system returns to the sleep mode at step 320.

Figure 4:
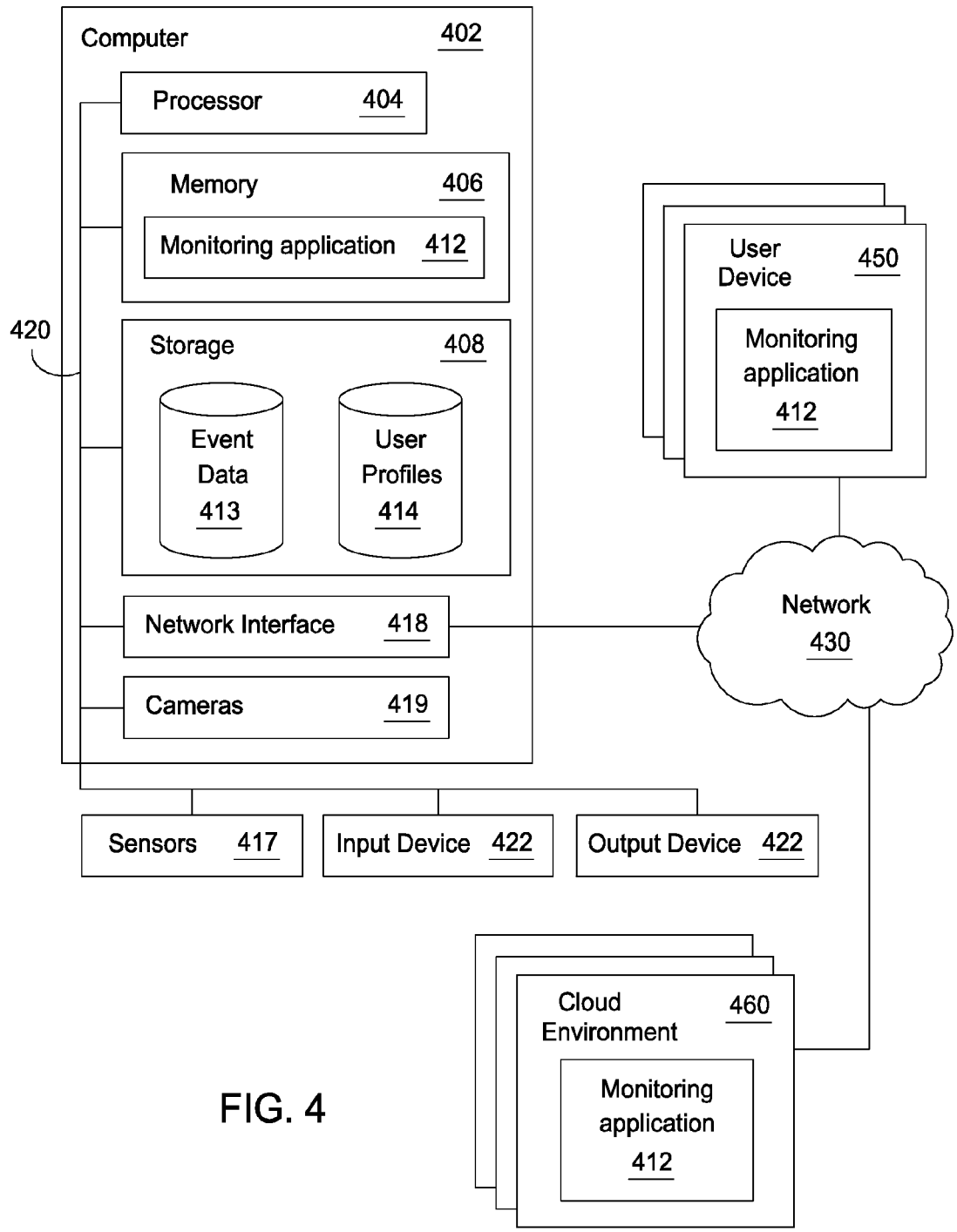
FIG. 4 is a block diagram illustrating a system for self-monitoring and alert systems in an intelligent vehicle, according to one embodiment.

FIG. 4 is a block diagram illustrating a system 400 for self-monitoring and alert systems in an intelligent vehicle, according to one embodiment. In one embodiment, the computer 402 is in a vehicle, such as a car, truck, bus, or van. The vehicle may be equipped with one or more information delivery systems (also referred to as an in-vehicle infotainment (IVI) system). The computer 402 may be powered by a dedicated battery (not pictured), which is separate from, and in addition to, a normal vehicle battery. The dedicated battery may be charged by the engine while the vehicle is operating. If the power level of the dedicated battery is below a predefined threshold power level, the normal vehicle battery may charge the dedicated battery, even while the vehicle is parked and the engine is turned off. The dedicated battery, therefore, may be used to power the computer 402 while operating in sleep mode and active mode.

The computer 402 may also be connected to other computers via a network 430. In general, the network 430 may be a telecommunications network and/or a wide area network (WAN). In a particular embodiment, the network 430 is the Internet. As shown, the network 430 facilitates communication between the computer 402, one or more user devices 450, and a cloud computing environment 460.

The computer 402 generally includes a processor 404 connected via a bus 420 to a memory 406, a network interface device 418, a storage 408, an input device 422, and an output device 424. The computer 402 is generally under the control of an operating system (not shown). Examples of operating systems include both proprietary operating systems and distributions of open source operating systems. More generally, any operating system supporting the functions disclosed herein may be used. The processor 404 is included to be representative of a single CPU, multiple CPUs, a single CPU having multiple processing cores, and the like. The network interface device 418 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, SAN storage, NAS storage, removable memory cards or optical storage. The memory 406 and the storage 408 may be part of one virtual address space spanning multiple primary and secondary storage devices.

The input device 422 may be any device for providing input to the computer 402. For example, a keyboard and/or a mouse may be used. The output device 424 may be any device for providing output to a user of the computer 402. For example, the output device 424 may be any conventional display screen or set of speakers. Although shown separately from the input device 422, the output device 424 and input device 422 may be combined. For example, a display screen with an integrated touch-screen may be used.

As shown, the memory 406 contains a monitoring application 412, which is an application generally configured to wait for events in a low-power sleep mode and enter a higher-power active mode when receiving an event notification. The monitoring application 412 may then process the event notification (in at least some embodiments by taking one or more actions), and send a notification to the user. For example, if an immersion sensor 417 indicates the vehicle is in rising water, the monitoring application 412 may take one or more photos of the car's surroundings using the camera 419, and send the photos to the user with a message telling the user to take action. The cameras 419 may provide video or photos of the interior or exterior of the vehicle.

The event sources sending notifications to the monitoring application 412 may be one or more sensors 417 of the vehicle, which may include thermometers, shock sensors, immersion sensors, door sensors, and the like. The event sources may also be user requests generated from an instance of the monitoring application 412 on one or more user devices 450, such as computers, smartphones, and tablets, or from an instance of the monitoring application 412 executing in the cloud 460. Generally, the monitoring application 412 is configured to receive input from any data source, internal or external to the vehicle. The notifications may be of any format, and may contain an explanation of the event, as well as audio, pictures, and video captured by the monitoring application 412. The monitoring application 412 may further be configured to determine whether each event is important (or relevant) enough to notify the user, in order to avoid sending too many notifications to the user.

The monitoring application 412 may also be configured to "wake up" the car into active mode at predefined intervals to check certain predefined status indicators or external information from the cloud environment 460, and send notifications to the user if relevant. The instances of the monitoring application 412 (or other applications) in the cloud environment 460 and the user devices 450 may send event notifications to the car that include requests for the car to take some action. For example, the request may specify to close the windows, or to broadcast a live video stream of the exterior surroundings of the vehicle.

As shown, storage 408 contains the event data 413 and user profiles 414. The event data 413 and/or the user profiles 414 may also be stored in the cloud environment 460 or the user device 450. The event data 413 includes information related to different events, such as an event source, data included with the event source, thresholds for the event, and any predefined event notifications that the monitoring application 412 can send to the user device 450. The user profiles 414 may include data for users, owners, or drivers of different vehicles, providing for customizable events, thresholds, and notifications.

Advantageously, embodiments disclosed herein enable vehicles to monitor themselves by analyzing incoming events from internal and external sources, and let users know of the event by sending one or more notifications. Users may be directly notified any time something happens to trigger an event in the vehicle, even if the car is turned off, and the user is far away from the car. Users or other applications can access or communicate with the vehicle remotely, via the Internet, in order to check the status of the car.

In the foregoing, reference is made to embodiments of the disclosure. However, it should be understood that the disclosure is not limited to specific described embodiments. Instead, any combination of the features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the monitoring application could execute on a computing system in the cloud and send a notification to one or more vehicles. In such a case, the monitoring application could define different events and store event parameters at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   in response to receiving a vehicle event notification by a computing system in a vehicle, switching the computing system from a sleep mode to an active mode;
   analyzing a vehicle event related to the vehicle event notification;
   determining that one or more parameters associated with the vehicle event or a score computed for the vehicle event exceeds a relevance threshold;
   in response, generating a user notification responsive to receiving the vehicle event notification;
   sending, to a user by a wireless data connection, the user notification; and
   returning the computing system to the sleep mode.

2. The method of claim 1, wherein the vehicle event notification specifies a request, and analyzing the vehicle event comprises processing the request after switching the computing system from the sleep mode to the active mode.

3. The method of claim 1, wherein the vehicle event notification is received from an event source of the vehicle, wherein the event source comprises at least one of: (i) a sensor, and (ii) a timer, wherein the sensor comprises: (i) a shock sensor, (ii) a door sensor, and (iii) an immersion sensor.

4. The method of claim 1, wherein the vehicle event notification is received from a user, wherein the user notification is generated by at least one of a cloud-based system and the vehicle.

5. The method of claim 1, wherein the vehicle event notification is received from a cloud-based system, wherein the user notification is generated by at least one of the cloud-based system and the vehicle.

6. The method of claim 1, wherein the sleep mode comprises a low power mode configured to receive the vehicle event notification, wherein the active mode comprises a power mode higher than the low power mode, wherein the vehicle event notification is processed in and the vehicle event is analyzed in the active mode.

7. The method of claim 1, wherein the user notification comprises at least one of: (i) an email, (ii) an SMS, (iii) a photograph, (iv) a video, (v) a phone call, (vi) a social media message, (vii) an audio notification, and (viii) a mobile application notification.

8. The method of claim 1, wherein the vehicle event comprises the user entering the vehicle, the method further comprising:
   taking a first photo of the vehicle interior subsequent to switching the computing system to the active mode; and
   prior to generating the user notification:
      taking a second photo of the vehicle interior subsequent to the user exiting the vehicle; and
      comparing the first photo to the second photo to detect an item left by the user in the vehicle, wherein the user notification comprises a indication that the user left the detected item in the vehicle.

9. A non-transitory computer-readable medium containing computer program code that, when executed by a processor, configures the processor to perform the steps of:
   in response to receiving a vehicle event by a computing system in a vehicle, switching the computing system from a sleep mode to an active mode;
   analyzing a vehicle event related to the vehicle event notification;
   determining that one or more parameters associated with the vehicle event or a score computed for the vehicle event exceeds a relevance threshold;
   sending, to a user by a wireless data connection, a user notification generated responsive to the vehicle event; and
   returning the computing system to the sleep mode.

10. The non-transitory computer-readable medium of claim 9, wherein the vehicle event specifies a request, wherein the computer program code configures the processor to process the request after switching the computing system from the sleep mode to the active mode.

11. The non-transitory computer-readable medium of claim 9, wherein the vehicle event notification is received from an event source of the vehicle, wherein the event source comprises at least one of: (i) a sensor, and (ii) a timer, wherein the sensor comprises: (i) a shock sensor, (ii) a door sensor, and (iii) an immersion sensor.

12. The non-transitory computer-readable medium of claim 9, wherein the vehicle event notification is received from a user, wherein the user notification is generated by at least one of a cloud-based system and the vehicle.

13. The non-transitory computer-readable medium of claim 9, wherein the vehicle event notification is received from a cloud-based system, wherein the user notification is generated by at least one of the cloud-based system and the vehicle.

14. The non-transitory computer-readable medium of claim 9, wherein the sleep mode comprises a low power mode configured to receive the vehicle event, wherein the active mode comprises a power mode higher than the low power mode, wherein vehicle event notification is processed in and the vehicle event is analyzed in the active mode.

15. The non-transitory computer-readable medium of claim 9, wherein the user notification comprises at least one of: (i) an email, (ii) an SMS, (iii) a photograph, (iv) a video, (v) a phone call, (vi) a social media message, (vii) an audio notification, and (viii) a mobile application notification.

16. The non-transitory computer-readable medium of claim 9, wherein the vehicle event comprises the user entering the vehicle, wherein the computer program code further configures the processor to perform the steps of:
   taking a first photo of the vehicle interior subsequent to switching the computing system to the active mode; and
   prior to generating the user notification:
      taking a second photo of the vehicle interior subsequent to the user exiting the vehicle; and
      comparing the first photo to the second photo to detect an item left by the user in the vehicle, wherein the user notification comprises a indication that the user left the detected item in the vehicle.

17. A vehicle equipped with a computing system, comprising:
   one or more computer processors; and
   a memory containing a program, which when executed by the one or more computer processors, configures the one or more computer processors to perform an operation comprising:
      in response to receiving a vehicle event notification, switching the computing system from a sleep mode to an active mode;
      analyzing a vehicle event related to the vehicle event notification;
      determining that one or more parameters associated with the vehicle event or a score computed for the vehicle event exceeds a relevance threshold;
      in response, generating a user notification responsive to receiving the vehicle event notification;
      sending, to a user by a wireless data connection, the user notification; and
      returning the computing system to the sleep mode.

18. The system of claim 17, wherein the vehicle event notification is received from an event source of the vehicle, wherein the event source comprises at least one of: (i) a sensor, and (ii) a timer, wherein the sensor comprises: (i) a shock sensor, (ii) a door sensor, and (iii) an immersion sensor.

19. The system of claim 17, wherein the vehicle event notification is received from a user, wherein the user notification is generated by at least one of a cloud-based system and the vehicle.

* * * * *